Nov. 21, 1939.  V. C. HAMISTER  2,180,735
PROCESS FOR MAKING SORPTIVE CARBON
Filed June 3, 1936
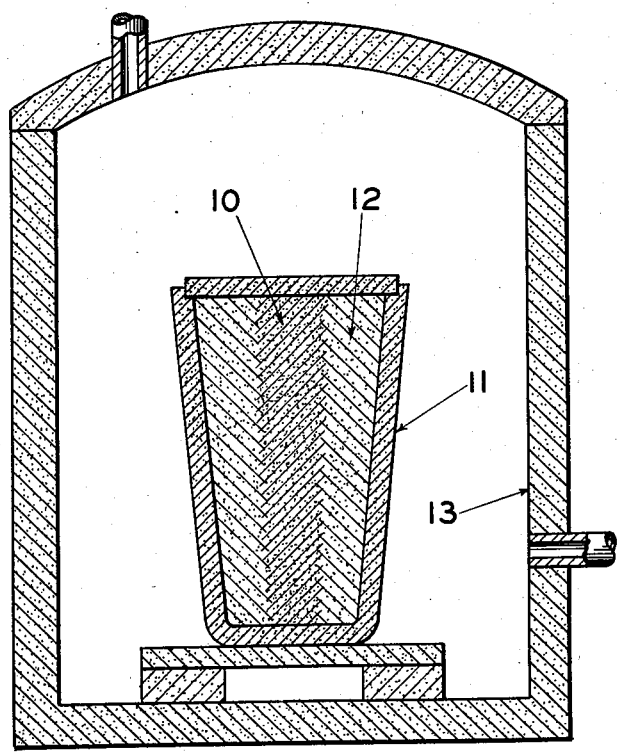
INVENTOR.
VICTOR C. HAMISTER
BY
ATTORNEY.

Patented Nov. 21, 1939

2,180,735

UNITED STATES PATENT OFFICE 2,180,735

PROCESS FOR MAKING SORPTIVE CARBON

Victor C. Hamister, Lakewood, Ohio, assignor to National Carbon Company, Inc., a corporation of New York Application June 3, 1936, Serial No. 83,195

6 Claims. (Cl. 252—3)

The invention relates to the manufacture of sorptive carbon.

When certain carbonaceous materials, notably vegetable charcoal, are oxidized under suitably controlled conditions they lose weight more rapidly than they decrease in volume. This decrease in apparent or bulk density is accompanied by a considerable increase in the "activity" of the material, that is, in the amount of other materials which it will attract and retain in its interior. The customary methods of activating carbon involve heating the carbon to a temperature in excess of about 700° C. in contact with an oxidizing gas such as steam or carbon dioxide.

One common method of effecting contact of the oxidizing gas with the carbon comprises introducing steam or flue gas into a horizontal, rotating, externally heated kiln containing granular carbon. This method produces a satisfactory and uniform product; but the yield of active carbon is very low, being less than 30% of the weight of the carbon charged to the kiln if the ordinary "50% active" grade of product is desired. Furthermore, the consumption of oxidizing gas per unit of product is undesirably high.

Another method of activation is to mix granular carbon with a granular decomposable carbonate, such as limestone, and to heat the mixture in an externally heated reaction vessel. This method produces higher yields and uses less oxidizing agent than the above-described kiln process; but the product consists of a mixture of unactivated carbon, partially activated carbon, and mechanically weak overactivated carbon, together with a relatively small proportion of properly activated product.

It is an object of the present invention to provide a process for activating carbon characterized by a relatively high yield, high efficiency in the use of the oxidizing agent, and a substantially uniform product. This and other objects are attained by establishing in a mass of granular carbon a temperature gradient and a concentration gradient of an oxidizing agent, the said gradients being so related that the higher concentration of oxidizing agent occurs in the cooler portion of the mass of carbon. These conditions may be attained in a number of different ways. For example, an externally heated reaction vessel may be packed with a central core of limestone surrounded by a filling of granular carbon; or it may be packed with concentric layers of different carbon-limestone mixtures, the mixtures containing the progressively higher ratios of limestone to carbon being located progressively nearer the center of the vessel; or it may have a centrally located distributor for steam or flue gas, the carbon being packed about the distributor. Or, the vessel may be heated by a central flue, in which case the concentration of oxidizing agent would be increased in the outer portions of the vessel. Alternatively, the heat may be applied at one wall of a reaction vessel and the concentration of oxidizing gas be progressively increased towards the opposite wall. With the above explanation of the principle involved, many different expedients for carrying the principle into effect will immediately become apparent, and the invention is not limited to or by the specific examples given herein by way of illustration.

A preferred embodiment of the invention is illustrated in the single figure of the attached drawing, which is a diagrammatic representation, in cross-section, of suitable apparatus for carrying out the invention. In this embodiment, a solid substance 10 which will liberate an oxidizing gas at suitably elevated temperatures, limestone for instance, is placed in the center of a closed reaction vessel 11, suitably a clay sagger. Comminuted carbonaceous material 12, preferably granular cocoanut charcoal, is packed about the oxidizing agent 10 within the vessel 11 and the vessel is placed within a heating chamber 13 which may be a gas-fired furnace. The vessel 11 is then heated to a temperature upwards of 700° C., usually between 850° C. and 1100° C., for a time which depends chiefly upon the size of the container, the temperature used, the degree of activation desired, and the character of the materials within the container. The correct heating time for any given set of conditions can readily be determined by a few trials.

Experimental tests which I have made demonstrate the useful and improved results obtainable in the practice of the invention. For instance, a number of clay saggers having an inside diameter of 13 inches and an inside length of 62 inches were filled with cocoanut charcoal and limestone, the limestone being packed along the central axis of the sagger, and the charcoal being packed about the limestone. The relative proportions used were 9.87 parts by weight of charcoal to 28.12 parts by weight of limestone. The charcoal was sized between 4 and 12 mesh (about 4.7 to 1.4 millimeters screen opening), and the limestone between 35 and 100 mesh (about 0.42 to 0.15 millimeter screen opening). The saggers were heated in a gas-fired furnace for 108 hours at a furnace temperature of 1000° C. to 1050° C. The average activity of the product was about 60%, and ranged from about 40% to about 65% in different portions of the product. The yield of active product was 4.34 parts for each 9.87 parts of charcoal charged, or about 44%.

Tests in which the charcoal and limestone in the saggers were uniformly mixed showed that, to obtain a product having an average activity of about 50% to 60%, about 3.5 to 4 parts by weight of limestone are required for each part of charcoal, that the yield is about 40%, and that the activity of the product varies from 6% or 10% in the center of the sagger to 100% or 150% at the outside of the sagger.

The rotary kiln, steam activation process requires about 10 pounds of steam per pound of product and produces a yield of about 27% of useful product, if an activity of 50% to 60% is desired.

Although specific examples of forms of carbon, kinds of oxidizing agents, and types of apparatus and process procedure have been mentioned herein by way of illustration, the invention is not limited to or by these specific embodiments. The invention disclosed is applicable to a wide variety of carbonaceous materials and oxidizing agents, and numerous modifications of apparatus and process details will be readily apparent.

Wherever used herein, the term "percentage activity" is the weight increase of a sample of carbon expressed as a per cent. of the initial weight of the carbon when air saturated with carbon tetrachloride at 0° is passed through a 5 gram sample until there is no further weight increase.

I claim:

1. Process for producing sorptive carbon which comprises heating a mass of granular vegetable charcoal and a decomposable solid oxidizing agent at temperatures upwards of about 700° C., establishing a substantial temperature gradient within said mass, and providing a concentration of the oxidizing agent greater in the cooler portions of said mass than in the hotter portions thereof.

2. Process for producing sorptive carbon which comprises forming a composite body containing carbonaceous material and a metal carbonate decomposable at temperatures of about 700° C., said carbonate being nonuniformly distributed in said body; and applying heat at a temperature above 700° C. to a region of said body where the proportion of said carbonate is relatively low, whereby progressively to liberate carbon dioxide from said carbonate and partially to oxidize said carbonaceous material.

3. Process for producing sorptive carbon which comprises forming a composite body containing granular nut charcoal and granular limestone, said limestone being nonuniformly distributed in said body; and applying to a region of said body where the concentration of said limestone is relatively low, heat at a temperature upwards of 700° C., whereby progressively to liberate carbon dioxide from said limestone and partially to oxidize said charcoal.

4. Process for producing sorptive carbon which comprises placing granular cocoanut charcoal and granular limestone in a reaction vessel, at least the major proportion of the charcoal being positioned in the outer portions of the vessel and at least the major proportion of the limestone being positioned in the central portions of the vessel, and applying to the outside of the vessel heat at a temperature between 850° C. and 1100° C., the granules of limestone being substantially smaller than the granules of charcoal.

5. Process for producing sorptive carbon which comprises forming a composite unbonded body containing granular char and granular metal carbonate decomposable at a temperature of about 700° C., the granules of char being of a size substantially different from that of the granules of carbonate and the carbonate being nonuniformly distributed in said body; and applying heat at a temperature above 700° C. to a region of said body where the proportion of said carbonate is relatively low, whereby progressively to liberate carbon dioxide from said carbonate and partially to oxidize said char.

6. Process for producing sorptive carbon which comprises placing granular cocoanut charcoal and granular limestone in a reaction vessel, at least the major proportion of the charcoal being positioned in the outer portions of the vessel and at least the major proportion of the limestone being positioned in the central portions of the vessel, and applying to the outside of the vessel, heat at a temperature between 850° C. and 1100° C.

VICTOR C. HAMISTER.